US012692827B2

(12) United States Patent
Hargreaves et al.

(10) Patent No.: US 12,692,827 B2
(45) Date of Patent: Jul. 28, 2026

(54) FUEL INJECTOR

(71) Applicant: PHINIA DELPHI LUXEMBOURG SARL, Belvaux (LU)

(72) Inventors: Andrew John Hargreaves, Faversham (GB); Michael Peter Cooke, Kent (GB)

(73) Assignee: PHINIA DELPHI LUXEMBOURG SARL, Belvaux (LU)

( * ) Notice: Subject to any disclaimer, the term of this patent is extended or adjusted under 35 U.S.C. 154(b) by 19 days.

(21) Appl. No.: 18/858,477

(22) PCT Filed: Apr. 21, 2023

(86) PCT No.: PCT/EP2023/060403

§ 371 (c)(1),
(2) Date: Oct. 21, 2024

(87) PCT Pub. No.: WO2023/203186

PCT Pub. Date: Oct. 26, 2023

(65) Prior Publication Data

US 2025/0270972 A1 Aug. 28, 2025

(30) Foreign Application Priority Data

Apr. 22, 2022 (GB) ..................................... 2205931

(51) Int. Cl.
*F02M 21/02* (2006.01)
*F02M 51/06* (2006.01)

(52) U.S. Cl.
CPC .... *F02M 21/0263* (2013.01); *F02M 21/0254* (2013.01); *F02M 51/0614* (2013.01); *F02M 2200/46* (2013.01); *F02M 2200/50* (2013.01)

(58) Field of Classification Search
CPC ........... F02M 21/0263; F02M 21/0254; F02M 51/0614; F02M 2200/46; F02M 2200/50;
(Continued)

(56) References Cited

U.S. PATENT DOCUMENTS 9,068,539 B2 6/2015 Coldren
2002/0070295 A1 6/2002 Baker et al.
(Continued)

FOREIGN PATENT DOCUMENTS

DE 102015226514 A1 * 6/2017 ......... F02M 51/0664
DE 102016204952 A1 * 9/2017 ......... F02M 21/0263
(Continued)

OTHER PUBLICATIONS

International Search Report for PCT/EP2023/060403 dated Aug. 21, 2023, 4 pages.

(Continued)

*Primary Examiner* — Hung Q Nguyen
(74) *Attorney, Agent, or Firm* — WARNER NORCROSS + JUDD LLP

(57) ABSTRACT

A fuel injector for delivering gaseous fuel to an internal combustion engine comprises: a nozzle body having a nozzle bore; a first valve needle received within the nozzle bore and engageable with a first valve seat to control gaseous fuel delivery through at least one outlet of an injection nozzle; a first actuator arrangement for controlling movement of the first valve needle;

a second valve needle engageable with a second valve seat to control gaseous fuel delivery through at least one outlet of the injection nozzle; and a second actuator for controlling movement of the second valve needle. The second valve seat is defined by the first valve needle, which defines an internal flow path for gaseous fuel flow when the second valve needle is lifted from the second valve seat and the first valve needle is lifted from the first valve seat.

16 Claims, 10 Drawing Sheets

(58) Field of Classification Search
CPC ............. F02M 45/086; F02M 51/0617; F02M 51/0675; F02M 51/0682; F02M 61/20; F02M 2547/006; F02M 21/0266; F02M 21/0275; F02M 61/045; F02M 61/12; F02M 21/0206; F02M 21/0248
See application file for complete search history.

(56) References Cited

U.S. PATENT DOCUMENTS

| | | | | |
|---|---|---|---|---|
| 2002/0145060 | A1 * | 10/2002 | Mills | F02M 51/0682 239/584 |
| 2012/0255523 | A1 | 10/2012 | Kim et al. | |
| 2015/0267659 | A1 | 9/2015 | Jaegle et al. | |
| 2020/0240366 | A1 | 7/2020 | Schule et al. | |
| 2021/0254589 | A1 | 8/2021 | Rottengruber et al. | |

FOREIGN PATENT DOCUMENTS

| | | | | |
|---|---|---|---|---|
| DE | 102017201581 | A1 | 8/2018 | |
| EP | 1566538 | A1 * | 8/2005 | F02M 45/086 |
| EP | 1626173 | A1 * | 2/2006 | F02M 51/0603 |
| EP | 3296554 | A1 | 3/2018 | |
| WO | 2018141535 | A1 | 8/2018 | |

OTHER PUBLICATIONS

Machine assisted English translation of DE102016204952A1 obtained from <https://patents.google.com/patent> on Oct. 17, 2024, 6 pages.

Machine assisted English translation of WO2018141535A1 obtained from https://patents.google.com/patent on Oct. 17, 2024, 6 pages.

* cited by examiner

FUEL INJECTOR

CROSS-REFERENCE TO RELATED APPLICATIONS

This application is the U.S. National Stage of International Application No. PCT/EP2023/060403 filed on 21 Apr. 2023, which claims priority to and all advantages of United Kingdom Application No. 2205931.5 filed on 22 Apr. 2022, the contents of which are incorporated herein by reference.

FIELD OF THE INVENTION

This invention relates to a fuel injector for use in a gaseous fuel injection system. In particular, the invention relates to a fuel injector for gaseous fuel such as hydrogen for delivering fuel to an internal combustion engine.

BACKGROUND

For gas injectors (particularly hydrogen) it is necessary to have a high flow area for the gaseous fuel to flow into the combustion space and gas flow velocities are very high. A valve needle is used to control the flow out of the injector and into the combustion space and a large seat diameter is therefore needed for the valve needle. The large seat diameter requires a high spring load to keep it closed against engine cylinder pressure when the gas pressure is low. When the gas pressure is high, the actuator which controls the valve needle must therefore overcome both the high spring force and the high gas force on the seat. The high gas velocities as the injector opens also means that the force does not drop off rapidly as the nozzle opens. The actuator therefore needs to provide a very high force to get the nozzle off its seat and a high force throughout the stroke. This presents a challenge for fuel injector design.

Additionally, when using hydrogen or other gas as a fuel the available pressure of the gas will reduce as the fuel tank empties. For a high-pressure capable injector to achieve full engine power at a wide range of injection pressures, the maximum required flow rate needs to be achieved at the lowest pressure. Therefore, at high injection pressure the flow rate of fuel through the nozzle is much higher than necessary. This can result in poor controllability of small injection quantities at high pressure. This is a problem if small pilot injections are required or if the engine drops from high load to idle (the gas will be at high pressure and cannot be regulated down to a lower pressure quickly).

It is against this background that the invention has been devised.

SUMMARY OF THE INVENTION

According to the present invention, there is provided a fuel injector for delivering gaseous fuel to an internal combustion engine, the fuel injector comprising a nozzle body provided with a nozzle bore; a first valve needle received within the nozzle bore and engageable with a first valve seat to control gaseous fuel delivery through at least one outlet of an injection nozzle at a first injection rate; a first actuator arrangement for controlling movement of the first valve needle; a second valve needle which is engageable with a second valve seat to control gaseous fuel delivery through at least one outlet of the injection nozzle at a second injection rate; and a second actuator for controlling movement of the second valve needle. The second valve seat is defined by the first valve needle, the first valve needle defining an internal flow path for gaseous fuel flow when the second valve needle is lifted from the second valve seat and the first valve needle is lifted from the first valve seat.

It is one benefit of the invention that the injection rate and/or injection quantity can be varied depending on whether one or both of the valve needles are operated. The invention provides the advantage of flexibility over the injection rate and injection pressure which has benefits for different engine combustion modes or operating conditions.

In embodiments of the invention, the first valve seat may have a seat diameter which is greater than the seat diameter of the second valve seat.

A further advantage of the invention is that the lift force required to open the valve needle to inject high pressure gaseous fuel, when a large flow (seat diameter) is required, is relatively reduced. This results from the diameter of the valve seat for the second valve needle being reduced compared to the diameter of the valve seat for the first valve needle. Furthermore, when both the first and second valve needles are to be actuated, once the second valve needle has been opened and fuel pressure starts to build up under the first valve needle due to the flow through the first valve needle, the force requirement is reduced even more so for subsequent opening of the first valve needle. In addition, when small, accurate injection quantities are required, then only the second valve needle needs to be opened so that the flow rate is lower and accuracy of injection is improved.

In embodiments of the invention, the second valve seat may be defined by the upper end surface of the first valve needle.

In embodiments of the invention, the internal flow path may define a restriction to restrict the rate of flow of fuel therethrough.

In embodiments of the invention, the fuel injector may include a first coupling member for the first valve needle, the first coupling member being coupled to an armature of the first actuator so that actuation of the first actuator arrangement causes movement of the first coupling member and the first valve needle. The first coupling member may be a first pull tube within which a portion of the first valve needle is received. The first pull tube may define an internal flow path for gaseous fuel.

The first pull tube may be provided with at least one opening to allow gaseous fuel to flow into the internal flow path when the second valve needle is lifted from the second valve seat.

In another embodiment of the present invention, the second valve needle may be provided with a second coupling member which is coupled to an armature of the second actuator so that actuation of the second actuator arrangement causes movement of the second coupling member and the second valve needle. The second coupling member may take the form of a second pull tube within which a portion of the second valve needle is received.

The second pull tube may define an internal flow path for gaseous fuel, and may be provided with at least one opening to allow fuel within the internal flow path to flow out of the second pull tube.

In embodiments, at least one of the first and second valve needles may have an associated lift member, the associated lift member being actionable by means of the associated one of the first and second actuator arrangements. The coupling member associated with the first or second valve needle may be coupled to the associated lift member so that movement of the associated lift member results in movement of the associated coupling member to lift the associated one of the first and second valve needles away from the respective valve seat.

By way of example, the second coupling member includes or is associated with an engagement surface which is spaced from the associated lift member of the second valve needle by a separation distance when the second valve needle is seated against the second valve seat. For example, the engagement surface may be a surface of a spring plate which is carried at the upper end of the second coupling member. The engagement distance may be closed when the second coupling member is actuated so as to bring the engagement surface into engagement with the associated lift member of the second valve needle, thereby causing the second valve needle to move away from the second valve seat.

In another example, the injector may include a spring plate which is coupled to the second coupling member and which defines an engagement surface, wherein the engagement surface is spaced from the associated lift member of the second valve needle by a separation distance when the second valve needle is seated against the second valve seat, the engagement distance being closed when the second coupling member is actuated so as to bring the engagement surface into engagement with the associated lift member of the second valve needle, thereby causing the second valve needle to move away from the second valve seat.

The first valve needle may equally be provided with the same lift mechanism as for the second valve needle described above.

In another example, an associated lift member may be provided for the first valve needle which is actioned by means of the first actuator arrangement. The first coupling member may be coupled to the associated lift member of the first valve needle so that movement of said associated lift member results in movement of the first coupling member to lift the first valve needle away from the first valve seat.

BRIEF DESCRIPTION OF THE DRAWINGS

In order that the invention may be more readily understood, preferred non-limiting embodiments thereof will now be described, by way of example only, with reference to the accompanying drawings, in which.

Figure 1:
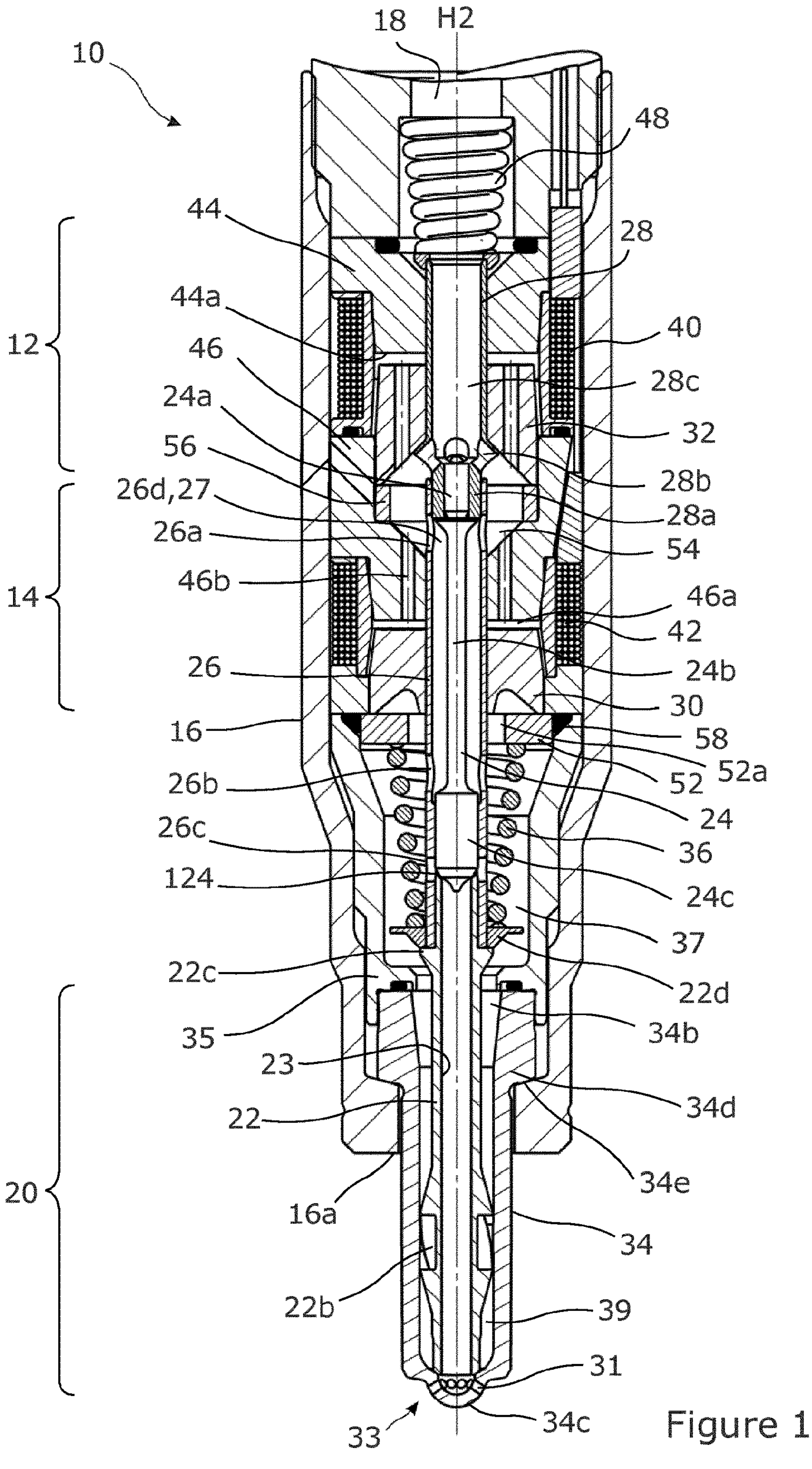
FIG. 1 is a cross-sectional view of a first embodiment of a fuel injector in the present invention in which the first and second valve needles are seated (closed state of the injector)

In the drawings, as well as in the following description, like features are assigned like reference signs.

Throughout this description, terms such as 'top', 'bottom', 'upper' and 'lower', and other directional references, are used with reference to the orientation of the fuel injector as shown in the accompanying drawings. However, it will be appreciated that such references are not limiting and that fuel injectors according to the invention could be used in any orientation.

DETAILED DESCRIPTION OF THE INVENTION

FIG. 1 is a cross-sectional view of a first embodiment of a fuel injector 10 in the present invention. The fuel injector 10 in this embodiment is of the inwardly-opening type and comprises a valve assembly and an actuator arrangement 12,14 for the valve assembly. The actuators 12,14 are received within a tubular housing 16 and controls the delivery of fuel into a cylinder of an internal combustion engine (not shown). The tubular housing 16 takes the form of a cap nut and receives the other parts of the fuel injector 10 also. An inlet 18 at the upper end of the fuel injector 10 defines the entry point for fuel delivered to the fuel injector 10 for injection. The fuel injector 10 has a longitudinal axis identified as L.

The valve assembly forms a part of an injection nozzle, referred to generally as 20, which is controlled by the actuator 12,14. The valve assembly comprises a first valve member 22 in the form of a lower valve member (which may be referred to as a lower valve needle) and a second valve member 24 in the form of an upper valve member (which may also be referred to as an upper valve needle). The lower valve needle 22 is a hollow tube having a central bore 23 which defines a flow path therethrough.

Each valve member 22,24 is attached to a respective coupling member, 26 and 28 respectively, which in turn is coupled to an armature 30,32 of a respective actuator arrangement 12, 14. In other words, the first (upper) actuator 12 is provided for the upper valve needle 24 and the second (lower) actuator 14 is provided for the lower valve needle 22. The upper and lower valve needles 24,22 are movable towards and away from a respective valve seat 124, 122 by means of the associated actuators 12,14, as will be described in further detail below.

The injection nozzle 20 includes a nozzle body 34 which is provided with a nozzle bore **34*b* in the form of a blind bore, with the blind end of the bore 34*b* located at a tip 34*c* of the nozzle body 34. The nozzle tip 34*c* defines a sac volume 33 which receives gaseous fuel in use for delivery to the combustion chamber of the engine (not shown). For this purpose, in the region of the sac volume 33 the wall of the nozzle body 34 is provided with a plurality of nozzle outlet(s) 31, which extend through the thickness of the walls of the nozzle body 34 to enable fluid communication between the nozzle bore 34***b* and the environment external to the fuel injector 10 (i.e. the combustion chamber). Only two nozzle outlets 31 are fully visible in the figures, with two more partially visible, due to the cross-section view, but it will be appreciated that the set of nozzle outlets 31 may comprise any suitable number of such outlets 31 arranged in any manner, such as but not limited to more than one row of outlets 31 arranged in a suitable manner, or a singular hole through the nozzle tip 34*c*.

The actuators 12, 14 are located above the injection nozzle 20 (in the orientation shown in FIG. 1) and are housed, together with the upper valve needle 24, within the tubular housing 16. A lower open end 16*a* of the tubular housing 16 receives an enlarged upper end 34*d* of the nozzle body 34 which is at the opposite end to the nozzle tip 34*c*.

At the upper end, the nozzle body 34 defines a shoulder region 34*e* which has an increased outer diameter when compared to the rest of the nozzle body 34. The shoulder region 34*e* is engaged with a step in the internal surface of the tubular housing 16 and the elongate stem of the nozzle body 34 extends and protrudes through the opening 16*a* at the lower end of the tubular housing 16. The enlarged upper end 34*d* of the nozzle body 34 is received within an insert 35 located within a lower section of the tubular housing 16. The insert 35 is a substantially cylindrical body having a wall and a central bore. In the lower region of the insert 35, a radially inward protruding flange extends radially inwards from the inner surface of the wall of the insert 35 to define a restriction to the central bore (i.e., the restriction is smaller in diameter than the central bore of the insert 35). The radially inward protruding flange defines a shoulder in the insert which engages with the enlarged upper end 34*d* of the nozzle body 34. The insert 35 defines a spring chamber 37 which houses a nozzle spring 36 for biassing the lower valve needle 22 into engagement with the valve seat 122 for the lower valve needle 22. On its upper face, the radially inward protruding flange is chamfered to guide fuel from the spring chamber 37 to the nozzle bore 34*b*, to promote a more streamlined fuel flow into the nozzle bore 34*b*.

The lower valve seat 122 is defined by a frusto-conical surface of the nozzle bore 34*b* of the injection nozzle 20.

The nozzle bore 34*b* defines, together with the outer surface of the lower valve needle 22, a delivery chamber 39 for receiving fuel from the spring chamber 37. The valve needle 22 is guided within the nozzle bore 34*b* in a conventional manner and grooves 22*b* are formed on the outside of the lower valve needle 22 to allow the fuel to flow through the delivery chamber 39 towards the nozzle tip 34*c*. When the lower valve needle 22 is lifted from the lower valve seat 122, fuel is therefore able to flow through the delivery chamber 39, through the grooves 22*b* and out through the nozzle outlets 31 which are opened up.

The lower valve needle 22 includes an upper end portion, remote from the lower valve seat 122, and a flared portion which defines an integral shoulder 22*c*. A collar 22*d* is carried on the integral shoulder 22*c* so that the integral shoulder 22*c* supports the collar 22*d*. The collar 22*d* defines a spring seat for the nozzle spring 36 and the lower end of the coupling member 26, which takes the form of a lower pull tube. The collar 22*d* is attached to the lower end of the lower pull tube 26 via welding or an interference fit. In operation, upon actuation of the lower actuator 14, upward motion of the lower pull tube 26 causes the lower valve needle 22 to accelerate upwards along the longitudinal axis L of the fuel injector 10, such that the lower valve needle 22 is lifted away from its seat 122.

The lower pull tube 26 extends away from the lower valve needle 22 and receives the upper valve needle 24 so that the lower end of the upper valve needle 24 seats against the valve seat 124 at the upper end of the lower valve needle 22 when in a closed position. The lower pull tube defines an internal flow path 27 for gaseous fuel.

The upper and lower actuators 12,14 are arranged axially in series along the longitudinal axis L of the fuel injector 10. Each actuator 12,14 comprises a coil, 40,42 respectively, which is mounted concentrically on an associated solenoid body, 44,46 respectively, in a radially outer region of the respective actuator 12,14 with the associated armature 32,30 located radially inward of the coil 40,42. For example, the upper actuator 12 includes an upper coil 40, an upper armature 32 and an upper solenoid body 44, and the lower actuator 14 includes a lower coil 42, a lower armature 30 and a lower solenoid body 46. The solenoid body 44,46 of each of the actuators 12,14 defines a stop surface, 44*a*, 46*a* respectively, of a corresponding one of the armatures 32,30. The lower armature 30 is provided axially below the lower solenoid body 46 and is mounted concentrically on the lower pull tube 26. On its lower end face, the lower armature 30 is recessed to define a lower armature chamber which fluidly communicates with the spring chamber 37. Upward movement of the lower armature 30 is limited by engagement with the lower surface 46*a* of the lower solenoid body 46. Upward movement of the upper armature 32 is limited when the upper armature 32 comes into engagement with the lower surface 44*a* of the upper solenoid body 44. The upper armature 32 further comprises a plurality of upper armature drillings (not labelled) which extend between its upper and lower end faces, and a tapered bore provided within its lower portion.

The upper valve needle 24 is provided with an upper pull tube 28 in a similar manner to the lower pull tube 26 for the lower valve needle 22. An armature return spring 48 for the upper actuator 12 is mounted within the inlet 18 of the fuel injector 10 and acts on the upper end of the upper pull tube 28, urging it downwards. The armature return spring 48 therefore serves to urge the combined mass of the upper armature 32, the upper pull tube 28 and the upper valve needle 24 towards the upper valve seat 124 so that an enlarged head 24*c* of the upper valve needle 24 engages the upper valve seat 124 and the upper armature 32 engages an upper stop member 56 (which may also be referred to as an annular stop member).

When the coils 40,42 of the actuators 12,14 are energized, this causes the respective coupling member 26,28 to be actioned or actuated, accelerating axially upwards along the longitudinal axis L of the fuel injector 10 such that the respective valve needle 22,24 is caused to lift. For example, when the upper actuator 12 is energized, the upper armature 32 is drawn in an upwards direction, opposing the force of the armature return spring 48 and, when the lower actuator 14 is energized, the lower armature 30 is drawn in an upwards direction, opposing the force of the nozzle spring 36.

If the actuators 12,14 are deenergized, the armatures 32,30 are urged in a downward direction under the respective spring forces, as described further below.

An intermediate chamber 54, defined within the lower solenoid body 46 between the upper and lower coils 40,42, defines a part of a flow path for fuel through the fuel injector 10. The lower solenoid body 46 is provided with a plurality of drillings 46*b* which communicate with the intermediate chamber 54. Similarly, the upper armature drillings also communicate with the intermediate chamber 54. The purpose of the drillings is to provide a flow path for fuel through the upper armature 32 and through the lower solenoid body 46 so as to allow pressure on either side of the armature 32 and the body 46 to remain constant.

The upper valve needle 24 is connected with a coupling member 28 in the form of an upper pull tube, in the same way as the lower valve needle 22 connects with the lower pull tube 26. The upper valve needle 24 includes three main portions; a relatively small diameter upper portion 24*a* and an intermediate portion 24*b* or stem which terminates in an enlarged head 24*c*. The outer surface of the stem 24*b* of the upper valve needle 24 defines, together with an internal bore 26*d* of the lower pull tube 26, a flow path 27 for fuel through the lower pull tube 26. The upper pull tube 28 has a lower portion 28*a* of reduced diameter which receives the upper portion 24*a* of the upper valve needle 24.

The upper portion 24*a* of the upper valve needle 24 extends through the intermediate chamber 54 and is connected with the upper pull tube 28. The lower portion of the upper pull tube 28 is provided with a plurality of drillings 28*b* to allow fuel to flow through an internal bore 28*c* of the upper pull tube 28 into the intermediate chamber 54 and onwards through the lower pull tube 26. The internal bore 28*c* of the upper pull tube 28 defines, together with the upper valve needle 24, an internal annular flow path for fuel through the upper pull tube. The drillings 28*b* extend radially outwards and with their axes aligned with the taper on the upper armature 32 such that the upper armature drillings remain in fluid communication with the internal bore 28*c* of the upper pull tube 28.

The enlarged head 24*c* of the upper valve needle 24 is engageable with the upper valve seat 124 when the upper valve needle 24 is in the ‘closed’ position. In other words, the region of the enlarged head 24*c* that engages with the upper valve seat 124 is profiled to create a seal with the upper valve seat 124 such that no fuel enters the lower valve needle 22 when the upper valve needle 24 is in the ‘closed’ position. The enlarged head 24*c* is of elongate form and has a slightly larger diameter than the rest of the valve needle 24. The enlarged head 24*c* terminates in a shaped tip which influences the fuel flow past the enlarged head 24*c* and into the bore 23 of the lower valve needle 22 when the upper valve needle 24 is open. The body of the enlarged head 24*c* is a sliding fit within a thick walled portion of the lower pull tube 26 such that there is substantially no fuel flow between the parts.

The upper armature 32 is attached to the upper pull tube 28 by welding or by means of an interference fit.

The lower pull tube 26 is provided with first, second and third sets of openings defined by drillings, 26*a*, 26*b*, 26*c* respectively, which extend radially through the wall of the lower pull tube 26. The first set of drillings 26*a* is provided in an upper region of the lower pull tube 26, the second set of drillings 26*b* is provided in a middle region of the lower pull tube 26 and the third set of drillings 26*c* is provided in a lower region of the lower pull tube 26. The second and third sets of drillings 26*b*,26*c* communicate with the spring chamber 37 and allow fuel to flow between the flow path defined by the lower pull tube 26, through the spring chamber 37 and past the open valve seat 124 of the upper valve needle 24, when the upper valve needle 24 is moved away from the valve seat 124. The second and third drillings 26*b*,26*c* therefore define a part of a flow path for fuel between the inlet 18 to the fuel injector 10 towards the downstream parts of the fuel injector 10 via the flow path 27 defined within the lower pull tube 26. The route for fuel to flow from the inlet 18 to the nozzle delivery chamber 39 therefore occurs via an internal flow path defined within the bore 28*c* of the upper pull tube 28, the drillings 28*b* in the upper pull tube 28, the intermediate chamber 54, the drillings 26*a*,26*b*,26*c* provided in the lower pull tube 26, and the nozzle spring chamber 37.

A lower annular member 52 is mounted axially below the bottom face of the lower armature 30 within an upper portion of the spring chamber 37. The lower annular member 52 defines an abutment surface for the upper end of the nozzle spring 36, and has a larger diameter than the lower armature 30 such that a portion of the upper face of the lower annular member 52 engages with the lower solenoid body 46. This holds the lower annular member 52 in place against the lower solenoid body 46 which holds the nozzle spring 36 in compression against the spring seat 22*d*. A clearance 52*a* is defined between the lower annular member 52 and the pull tube 26 such that the spring chamber 37 fluidly communicates with the lower armature chamber to allow the pressure on either side of the lower annular member 52 to equalize.

An annular ring 58 is mounted radially outwards of the lower annular member 52.

Because the pull tubes 26,28 are tubular components, they conveniently provide a means for flowing gaseous fuel through the fuel injector 10. Fuel is introduced into the inlet 18 and flows through and around the armature return spring 48 and onwards through the upper pull tube 28, through the plurality of drillings 28*b* in the upper pull tube 28 and towards the intermediate chamber 54. The fuel then flows through the upper drillings 26*a* of the lower pull tube 26, into the bore 26*d* of the lower pull tube 26, and into the spring chamber 37 via the middle drillings 26*b* of the lower pull tube 26. When the upper valve needle 24 is moved away from its valve seat 124, fuel then flows from the spring chamber 37 through the lower drillings 26*c* in the lower pull tube 26 and through the lower valve needle 22 to the downstream parts of the nozzle 20. The grooves or flutes 22*b* permit fuel to be delivered to the sac volume 31 of the nozzle body 34.

Operation of the fuel injector 10 will now be described with reference to FIGS. 1, 2 and 3.

With the actuators 12, 14 de-energised, the lower valve needle 22 is in a ‘closed’ position seated against the lower valve seat 122, held in place by the force due to the armature return spring 48 and the nozzle spring 36, and fuel is prevented from being delivered to the internal combustion engine through the nozzle outlets 31. This is the state of the fuel injector 10 in FIG. 1.

Figure 2:
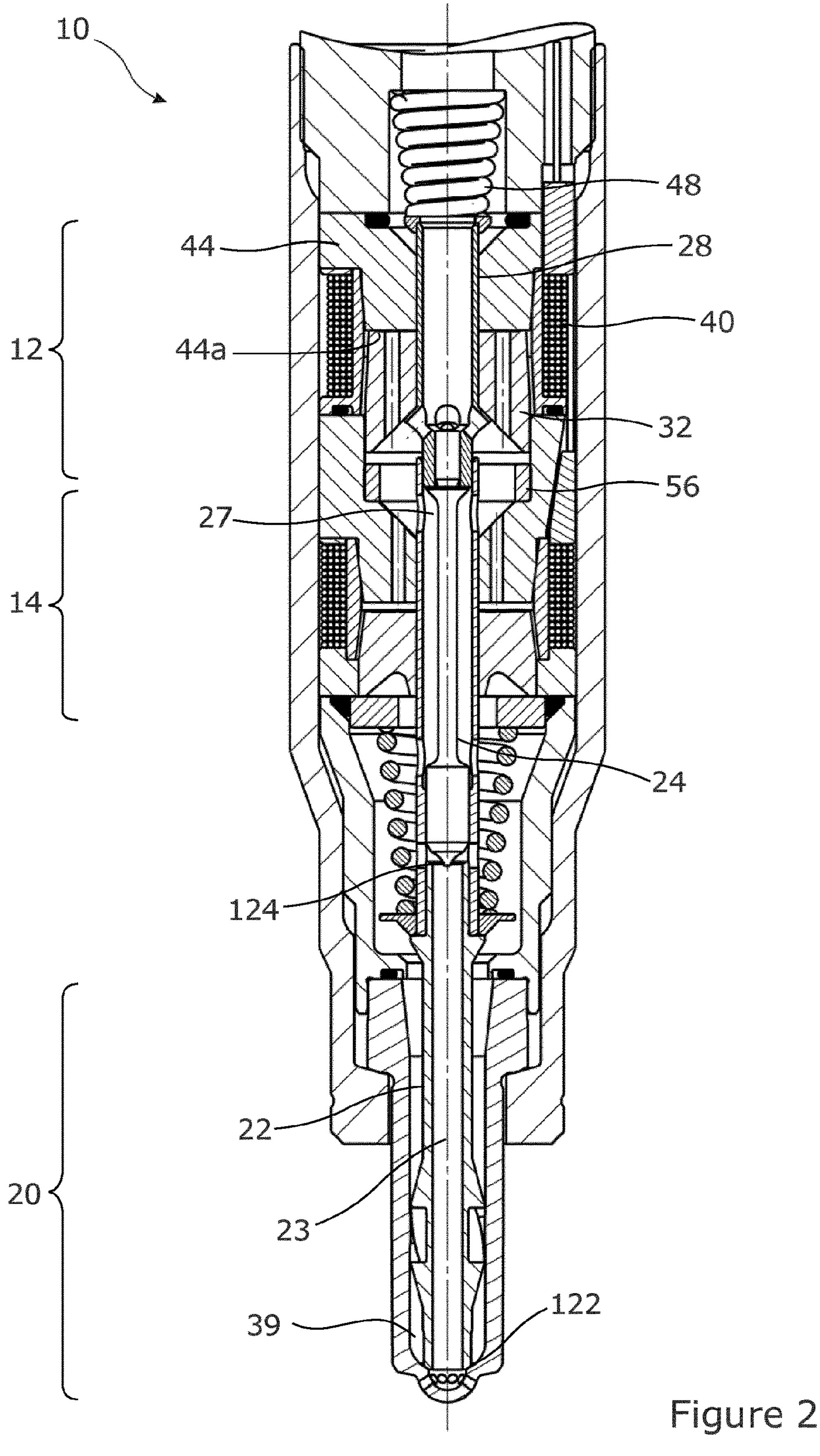
FIG. 2 is a cross-sectional view of the fuel injector in FIG. 1 when one of the valve needles is lifted away from the valve needle seat (first injecting state of the injector)

Referring to FIG. 2, when a current is applied to the coil 40 of the upper actuator 12, this causes an electromagnetic force to act on the upper armature 32. The upper armature 32 is drawn upwardly, against the force of the armature return spring 48 pressing down on the upper pull tube 28, and the upper pull tube 28 is drawn upwardly causing the upper valve needle 24 to move away from the upper valve seat 124. When the upper valve needle 24 is moved away from the upper valve seat 124, gaseous fuel delivered through the upper pull tube 28 and into the spring chamber 37 is able to flow past the exposed valve seat 124 and through the central bore 23 of the lower valve needle 22 out through the nozzle outlets 31. This is the state of the fuel injector 10 shown in FIG. 2. It will be appreciated that as the lower actuator 14 is not energised at this time, the lower valve needle 22 remains engaged with the lower valve seat 122 so that no fuel is able to flow directly from the delivery chamber 39 through the outlets 31, and only through the internal flow path defined by the central bore 23.

The extent of lift of the upper valve needle 24 is limited as the upper armature 32 can only lift so far until it engages with the lower surface 44*a* of the upper solenoid body 44. The closing movement of the upper valve needle 24 is limited by the upper valve needle 24 returning to the upper valve seat 124.

Figure 3:
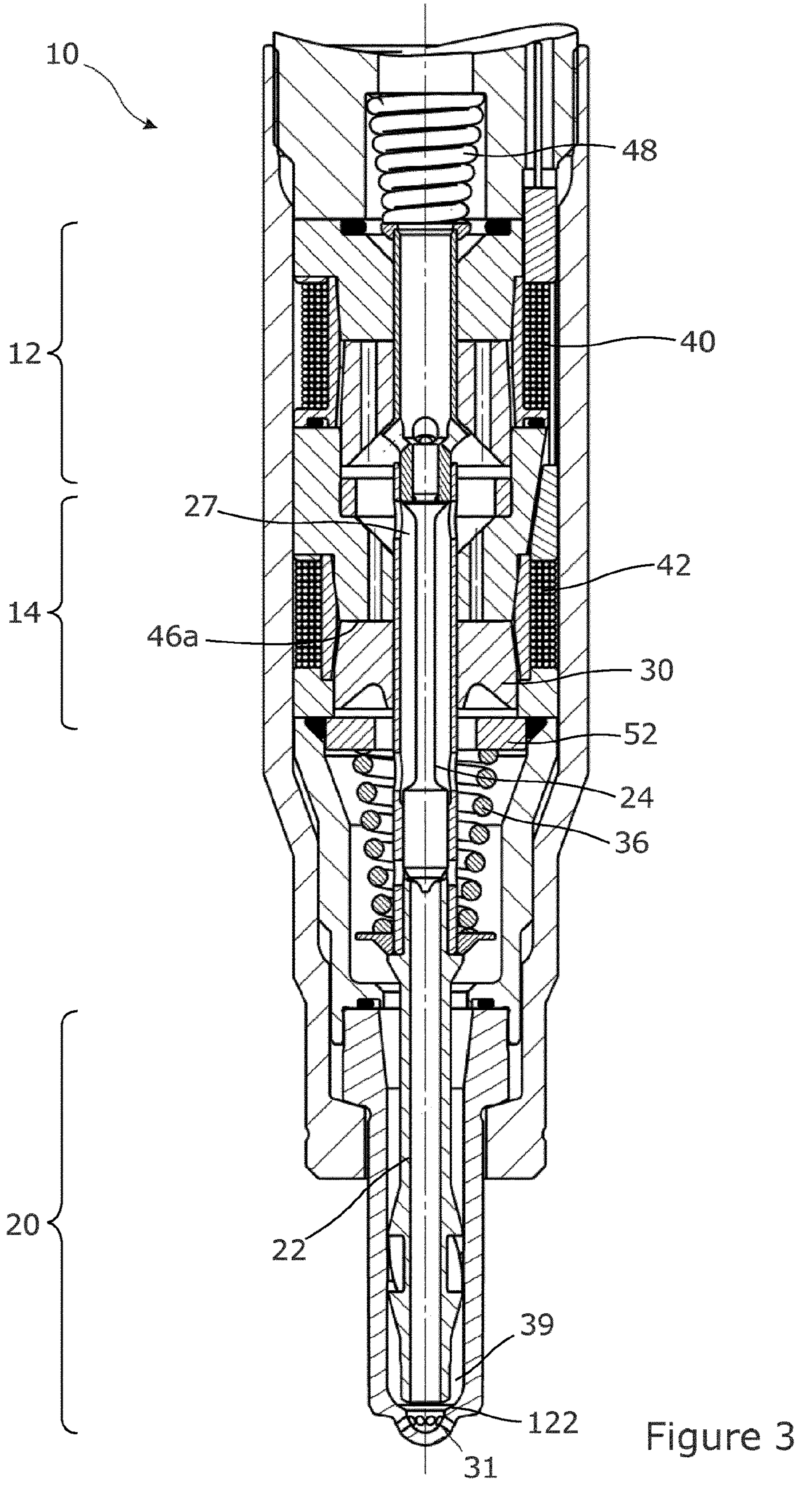
FIG. 3 is a cross-sectional view of the fuel injector in FIG. 1 when both of the valve needles are lifted away from the valve needle seats (second injecting state of the injector)

FIG. 3 shows the fuel injector 10 in a position in which both the upper actuator 12 and the lower actuator 14 are energized. As before, an electric current is applied to the coil 40 of the upper actuator 12 to cause the upper valve needle 24 to lift. In addition, a current is applied to the coil 42 of the lower actuator 14, which causes an electromagnetic force to act on the lower armature 30, pulling the lower armature 30 upwards against the force of the nozzle spring 36 which tends to hold the lower valve needle 22 closed. The lower armature 30 therefore accelerates upwards, causing the lower valve needle 22 to move away from the lower valve seat 122. This is a second injecting state of the fuel injector 10 in which both the upper valve needle 24 and the lower valve needle 22 are unseated, allowing gaseous fuel to flow both through the lower valve needle 22, and through the nozzle delivery chamber 39, and out through the outlets 31.

Conveniently, the high gas pressure immediately upstream of the outlets 31 (and surrounding the integral shoulder 22*c* and other upwardly-directed surfaces) when the lower valve needle 22 is closed, aids in providing the force to lift the lower valve needle 22, opposing the closing force of the nozzle spring 36, when the lower actuator 14 is energized.

The extent of opening movement of the lower valve needle 22 is limited by the lower armature 30 coming into contact with the lower surface 46*a* of the lower solenoid body 46. Closing movement of the lower valve needle 22 is brought to a stop when the lower valve needle 22 is returned into engagement with its valve seat 122.

The fuel injector 10 is returned to its closed state by deenergizing the upper and lower actuators 12, 14.

It will be appreciated that because the upper and lower valve needles 22,24 can be activated separately, the fuel injector 10 is able to provide controlled injection quantities over a range of injection pressures.

In both the first and second injecting states (FIGS. 2 and 3) the flow of fuel through the lower valve needle 22 may be restricted by the thickness of the walls of the lower valve needle 22, which may be selected optimally to provide accurate control of the flow rate. In another embodiment (not shown), an orifice may be inserted in the central bore 23 of the lower valve needle 22 to further restrict the flow and provide a desired control of the flow rate.

Figure 4:
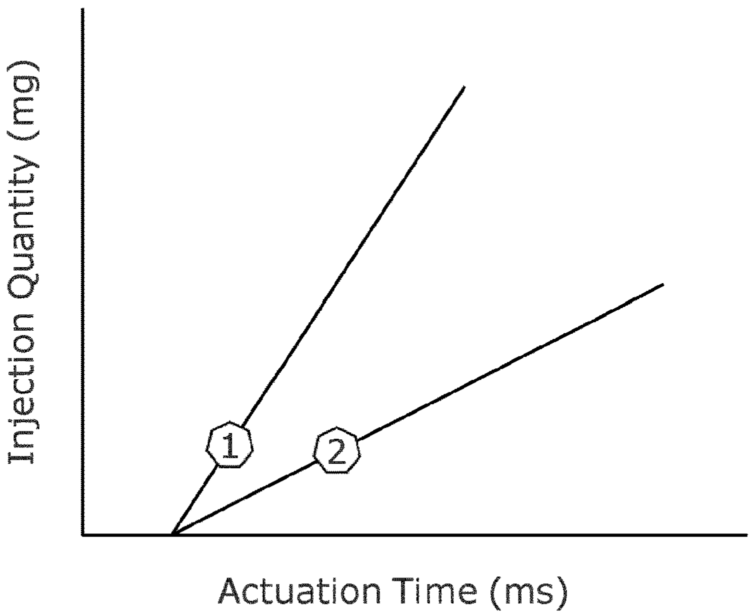
FIG. 4 shows the gain curves with (1) both valve needles open, and (2) with only one valve needle open.

By way of example, FIG. 4 illustrates two possible injection quantities as a function of the actuation time for; (1) a higher quantity of injected fuel which is achieved by opening both the upper valve needle 24 and the lower valve needle 22 together and (2) a lower quantity of injected fuel is achieved by opening just the upper valve needle 24.

Figure 5:
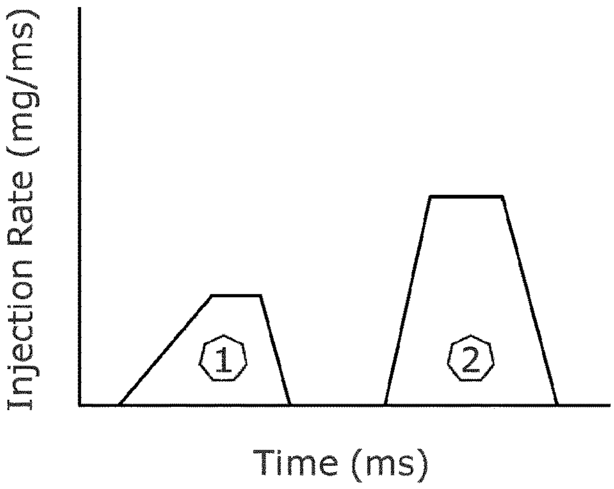
FIG. 5 shows the injection rate with (1) only one valve needle open, and (2) both valve needles open.

FIG. 5 illustrates two different injection rate characteristics which can be achieved; (1) with only the upper valve needle 24 open (a lower injection rate) and (2) both valve needles 22,24 open (a higher injection rate).

Figure 6:
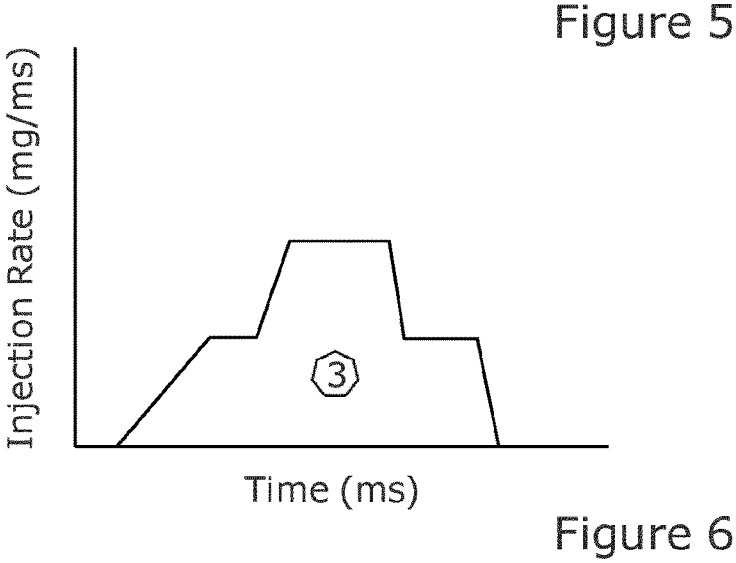
FIG. 6 shows the variable injection rate that is achievable within one injection.

FIG. 6 illustrates a more complex injection rate characteristics which can be achieved by merging the opening of the upper and lower valve needles, without closing the upper valve needle 24 before the lower valve needle 22 is opened as well.

The invention provides the advantage of flexibility over the injection rate and injection pressure which has benefits for different engine combustion modes or operating conditions. For example, a lower injection pressure and injection rate may be beneficial early in the combustion cycle and then as cylinder pressure rises a higher injection pressure may be beneficial. The twin valve needle arrangement in the present invention allows this degree of flexibility and control.

It is a further benefit of the invention is the reduced force requirement to inject high pressure gaseous fuel when a large flow (seat diameter) is required. This results from the diameter of the valve seat 124 for the upper valve needle 24 being reduced compared to the diameter of the valve seat 122 for the lower valve needle 22. Furthermore, when both the upper and lower valve needles are to be actuated, once the upper valve needle 24 has been opened and fuel pressure starts to build up under the lower valve needle 22 due to the flow through the lower valve needle 22, the force requirement is reduced even more so for subsequent opening of the lower valve needle 22. When small, accurate injection quantities are required, then only the upper valve needle 24 needs to be opened so that the flow rate is lower and accuracy of injection is improved.

Figure 7:
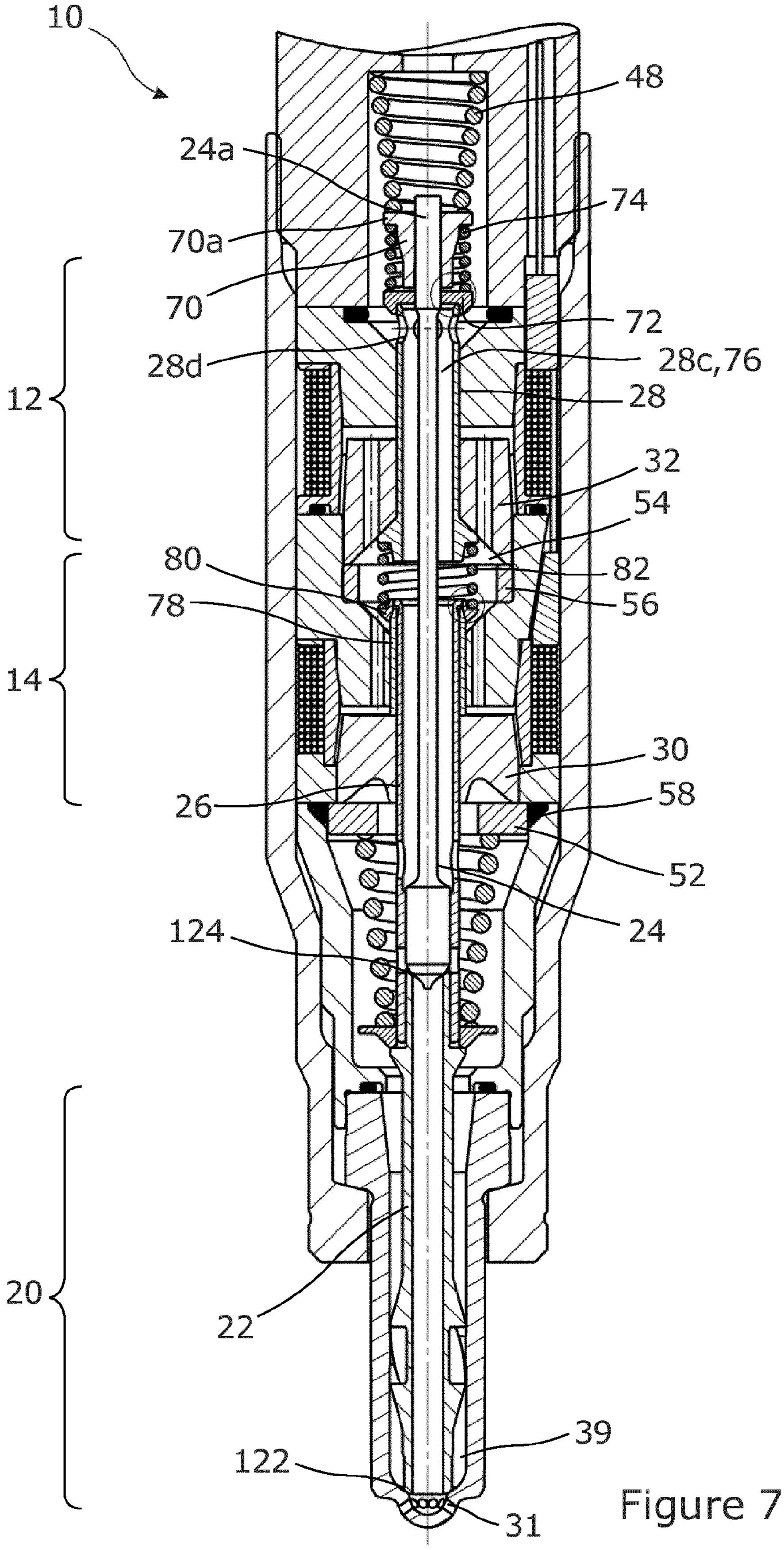
FIG. 7 is a cross-sectional view of a second embodiment of the fuel injector in the present invention.
Figure 8:
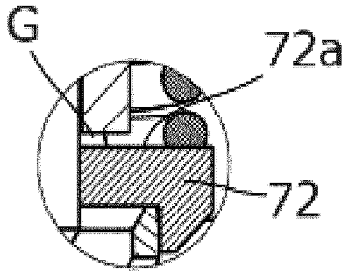
FIG. 8 is an enlarged view of an anvil 70 feature of the fuel injector in FIG. 7.
Figure 9:
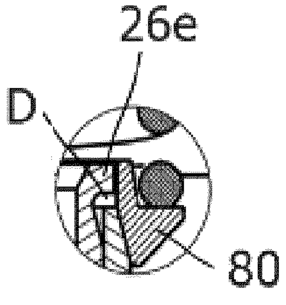
FIG. 9 is an enlarged view of a lift component of the fuel injector in FIG. 7.

FIGS. 7, 8 and 9 show an alternative embodiment of the fuel injector 10 shown in FIG. 1, in which the force required to achieve the full lift is aided by a 'hammer' action. In this embodiment, the mechanism for lifting the upper valve needle 24 is different to that in the previous embodiment. Similar parts to those in the previous figures are labelled with the same reference numbers.

The upper end 24*a* of the upper valve needle 24 is received through a lift member 70 in the form of an anvil which includes a flange 70*a* at its top end. The upper end 24*a* of the upper valve needle 24 protrudes beyond the top end of the lift member 70. The anvil 70 is attached to the upper end 24*a* of the upper valve needle 24 by welding or an interference fit. The upper end 24*a* of the upper valve needle 24 includes or is associated with an intermediate spring seat 72 (which may also be referred to as a spring plate). The upper end 24*a* of the upper valve needle 24 is received through the intermediate spring seat or spring plate 72. The spring plate 72 abuts the upper end of the upper pull tube 28 and is attached thereto by means of welding or an interference fit. The spring plate 72 defines an upper engagement surface 72*a* for the anvil 70 on its upper face, and is tapered on its lower edge to define a transition surface for fuel flow into the internal bore 28*c* of the upper pull tube 28 via upper radial drillings 28*d*. Advantageously, this promotes a streamlined flow of fuel from the inlet 18 to the downstream parts of the fuel injector 10. An intermediate spring 74 is located between the flange 70*a* of the anvil 70 and the intermediate spring seat 72. The intermediate spring 74 acts through the spring plate 72 and therefore biases the upper pull tube 28 downwards, urging the upper armature 32, which is connected to the upper pull tube 28, onto the upper stop member 56.

As in the previous embodiment, the armature return spring 48 serves to urge the upper valve needle 24 onto the upper valve seat 124, therefore basing it closed.

The lower surface of the anvil 70 and the upper surface of the spring plate 72 together define a gap, G, as better illustrated in FIG. 8, so that, when the upper pull tube 28 starts to lift upon activation of the upper actuator 12, the upper end of the upper pull tube 28 and the spring plate 72 have to first move through the distance of the gap, G, before the engagement surface 72*a* of the spring seat 72 is brought into engagement with the anvil 70, thereby causing the anvil

70, and hence the upper valve needle 24, to lift also. In this way, upward movement of the upper pull tube 28 transmits an impact force to the anvil 70 which causes the upper pull tube 28, and the upper valve needle 24, to lift under a 'hammer' action against the force of the armature return spring 48. The surface area defined by the lower surface of the anvil 70 which is impacted by the engagement surface 72*a* of the spring seat may be any suitable area that provides sufficient contact between the two parts.

The spring plate 72 is shown as a separate feature from the pull tube 28 but may equally form an integral part of the upper pull tube 28.

In this embodiment the upper valve needle 24 has a reduced diameter compared to the upper pull tube 28 so that the upper portion of the upper valve needle 24 extends through the upper pull tube 28 with an annular clearance. The annular clearance defines an internal flow passage 76 for fuel which is delivered through the inlet 18 of the injector and through the upper radial drillings 28*d* in the upper pull tube 28 into the internal flow passage 76. Fuel flowing through the upper pull tube 28 is able to flow through the intermediate chamber 54 and onwards through the lower pull tube 26 towards the spring chamber 37 and, hence, the delivery chamber 39.

The annular member 56 is located just below the upper armature 32 and acts as a stop member. The upper stop member 56 defines a stop surface to limit downward movement of the upper armature 32. In addition, the lower annular member 52 (which may be referred to as the lower stop member) defines a stop surface to limit downward movement of the lower armature 30. Because the lower stop member 52 is conveniently held in place by the nozzle spring 36, this enables the lower stop member 52 to absorb the impact from the lower armature 30 when the lower valve needle 22 closes.

The upper and lower stop members 56,52 are typically made of a material with damping properties, such as a polymer, to minimize armature bounce at the end of travel.

The annular ring 58 is mounted over the lower stop member 52 and provides further damping when the lower armature 30 is brought to a stop upon engagement with the lower stop member 52. The annular ring 58 may also provide the function of a seal to prevent gas from escaping from the fuel injector 10. The annular ring 58 may be made of an elastomer material or any material with sufficient damping properties. As described previously, whilst the lower armature 30 is provided with the lower stop member 52 to limit the extent of travel downwards, the upper stop for the lower armature 30 is defined by a surface 46*a* of the lower solenoid body 46. The stop surfaces 44*a*,46*a* are sized and dimensioned so that movement of the upper and lower armatures 32,30 is stopped substantially at the same time when they are moved upwardly upon actuation of the solenoids 12,14.

The lift arrangement for the lower valve needle 22 also differs to that shown in FIGS. 1, 2 and 3. The lower valve needle 22 is coupled to the lower pull tube 26, as described previously, but in this case the upper end of the lower pull tube 26 is slidably received through a lift sleeve 78. At its lower end, the lift sleeve 78 abuts the upper surface of the lower armature 30. The lift sleeve 78 is provided with a tapered surface on its upper region and, at its upper end, the lift sleeve 78 is sandwiched radially between the outer surface of the lower pull tube 26 and a spring seat 80 to which it is joined. Specifically, an inner surface of the spring seat 80 is profiled to engage with the tapered surface of the lift sleeve 78. The upper surface of the lift sleeve 78 is a flat surface. The upper end of the lower pull tube 26 terminates in a rim 26*e*, as better illustrated in FIG. 9, which extends radially from the top of the lower pull tube 26 to engage with the spring seat 80. In other words, the rim 26*e* is shaped such that the vertical face which engages with the spring seat 80 has a larger diameter than the outer walls of the lower pull tube 26. There is a small gap, D, between the top of the lift sleeve 78 and the rim 26*e* of the lower pull tube 26.

The spring seat 80 defines a lower seat for a spring 82 which is located within the intermediate chamber 54. At its other end, the spring 82 is engaged with a lower portion of the upper pull tube 28 which flares radially outwards and which defines a shoulder portion. The spring 82 serves to urge the lift sleeve 78 and the lower armature 30 downwards and hence urges the lower armature 30 against the stop surface defined by the lower stop member 52. The lower armature 30 is not connected to the lower pull tube 26 so that the lower armature 30 is able to slide relative to the lower pull tube 26.

FIGS. 7 to 9 show the fuel injector 10 when in a non-injecting state with both the lower valve needle 22 and the upper valve needle 24 engaged with their respective seats 122, 124. In this state of operation no fuel is able to flow through the outlets 31.

Figure 10:
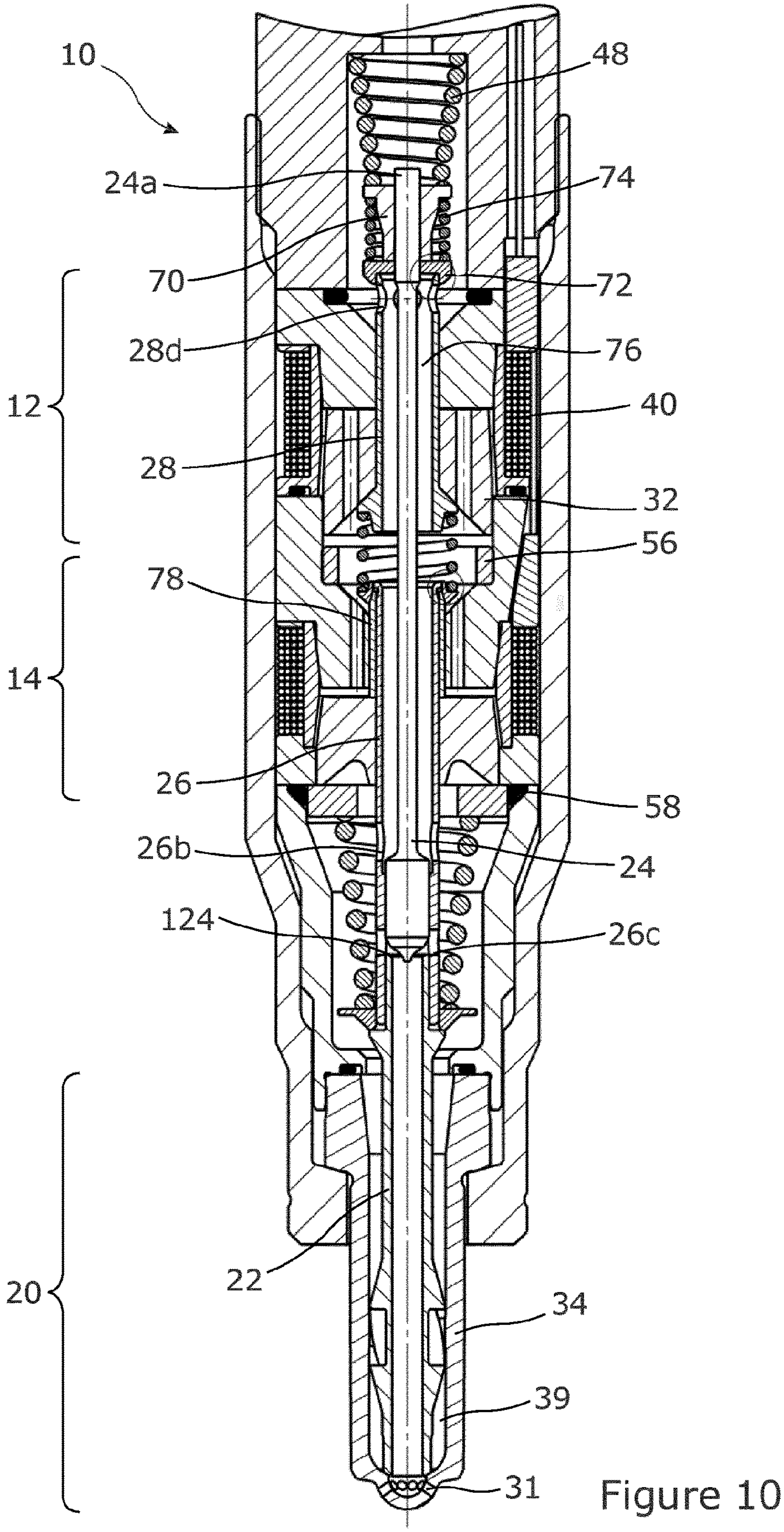
FIG. 10 is a cross-sectional view of the fuel injector in FIG. 7 in an operating state in which the upper valve needle is fully lifted away from the upper valve seat.

FIG. 10 is a cross-sectional view of the fuel injector 10 in FIG. 7 when the upper valve needle 24 is fully lifted away from the valve seat 124. In order to achieve this injecting state the current is applied to the coil 40 of the upper actuator 12, which causes an electromagnetic force to act on the upper armature 32. As the upper armature 32 starts to move axially upwards, the upper pull tube 28 and the spring plate 72 are caused to accelerate upwardly along the longitudinal axis L, opposing the force of the intermediate spring 74. Once the upper armature 32 has moved through the distance G, the upper engagement surface 72*a* of the spring plate 72 engages with the anvil 70, which transmits an impact force to the anvil 70, causing the anvil 70 to lift. This can be seen in FIG. 11 where the gap, G, is closed between the spring plate 72 and the anvil 70. As the anvil 70 is caused to move upon impact, the upper end 24*a* of the upper valve needle 24 (being coupled to the anvil 70) is also lifted upwardly (as a result of the impact force on the anvil 70), opposing the force of the armature return spring 48 and causing the upper valve needle 24 to move away from the upper valve seat 124.

Figure 12:
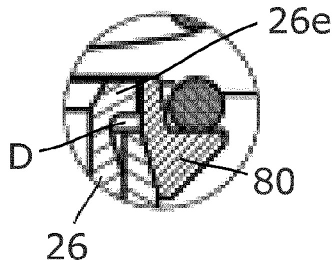
FIG. 12 is an enlarged view of the lift component of the fuel injector in the operating state in FIG. 10.

It will be appreciated that as the lower actuator 14 remains deactivated at this time, the lift sleeve 78 remains spaced by a distance D from the upper rim 26*e* of the lower pull tube 26, as shown in FIG. 12, and the lower valve needle 22 remains seated. With only the upper valve needle 24 lifted, fuel injection occurs as a result of gaseous fuel flowing through the annular clearance 76, the various drillings 28*d*,26*b*, 26*c* in the pull tubes, the intermediate chamber 54 and the central bore 23 of the lower valve needle 22 and then out through the outlets 31, but there is no injection of fuel directly between the delivery chamber 39 in the nozzle body 34.

An advantage of the anvil arrangement is that an increased force is available to initiate the upper valve needle 24 to lift from the valve seat 124, as described in our co-pending European patent EP2295785 B1. The 'hammer' action advantageously reduces the force required to inject gaseous fuel at high pressures when a large flow area is required. This is due to the impulse force provided by the 'striking' of the anvil 70 which has been shown to provide 50% more force to full lift.

Figure 11:
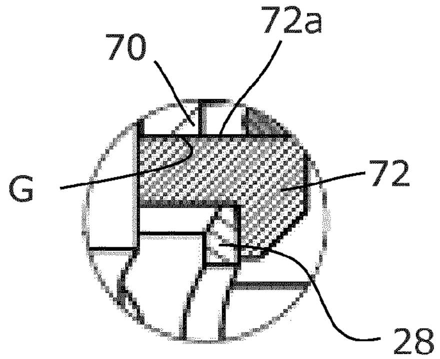
FIG. 11 is an enlarged view of the anvil 70 feature of the fuel injector in the operating state in FIG. 10.
Figure 13:
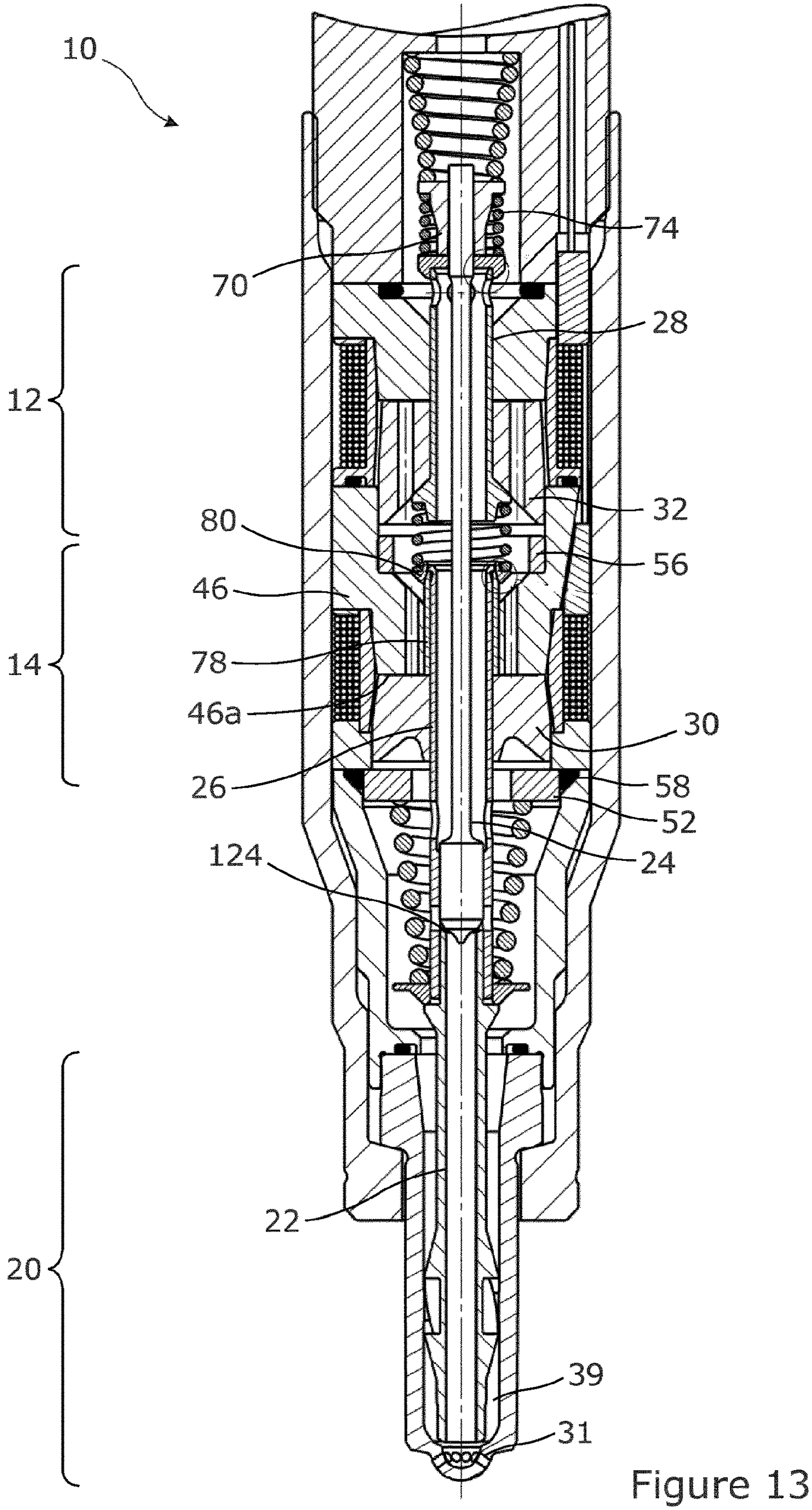
FIG. 13 is a cross-sectional view of the fuel injector in FIG. 7 in an operating state in which the lower valve needle is fully lifted away from the valve needle seat.

FIG. 13 is a cross-sectional view of the fuel injector 10 in FIGS. 11 and 12 at the point that the upper and lower actuators 12,14 are energized. A current is separately applied to the coil 42 of the lower actuator 14, which causes an electromagnetic force to act on the lower armature 30. The lower armature 30 moves in an upward direction away from the lower stop member 52 until it engages with the stop surface 46*a* of the lower solenoid body 46.

Figure 15:
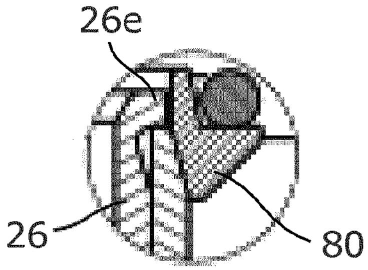
FIG. 15 is an enlarged view of the lift component of the fuel injector in the operating state in FIG. 13.

The upward movement of the lower armature 30 causes the lift sleeve 78 and the spring seat 80 to move upwardly. Once the lift sleeve 78 and the spring seat 80 have travelled a distance D, the lift sleeve 78 comes into contact with the rim 26*e* of the lower pull tube 26 (as best seen in FIG. 15) which transmits an impact force on the lower pull tube 26, causing the lower valve needle 22 to lift.

Figure 14:
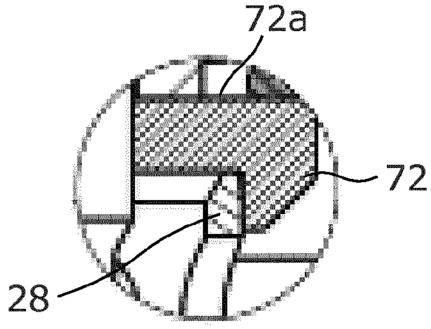
FIG. 14 is an enlarged view of the anvil 70 feature of the fuel injector in the operating state in FIG. 13.

It will be appreciated that if both the upper and lower actuators 12,14 are activated together, this causes the upper pull tube 28 to move the anvil 70 and the upper valve needle 24 (as seen in FIG. 14), and causes the lower pull tube 26 to lift the lower valve needle 22, so that injection occurs through the outlets 31 via the delivery chamber 39 as well as through the lower valve needle 22.

When the actuators 12,14 are deenergized, the armatures 30,32 are urged in a downward direction under the respective spring forces, as described further below.

In the absence of an electromagnetic force from the upper actuator 12, the spring force of the intermediate spring 74 acting on the spring plate 72 urges the combined mass of the upper armature 32, the spring plate 72, the upper pull tube 28 and the upper valve needle 24 in a downward direction towards the upper valve seat 124. The anvil 70 remains stationary as the intermediate spring 74 extends which causes the separation distance G between the anvil 70 and the spring plate 80 to open up. The motion of the upper armature 32 is interrupted when the lower surface of the upper armature 32 meets the upper surface of the upper stop member 52, around the same time as the enlarged head 24*c* of the upper valve needle 24 engages with the upper valve seat 124. This defines the closed position of the upper valve needle 24.

At the same time, the spring force of the intermediate spring 74 encourages the downward movement of the lower valve needle 22 towards the lower valve seat 122 via the force of the spring 82 acting on the spring seat 80. This causes the combined movement of the lower armature 30, the lift sleeve 78, the spring seat 80 and the lower pull tube 26 in a downward direction along the longitudinal axis L until the lower surface of the lower armature 30 meets the upper surface of the lower stop member 52. This defines the closed position of the lower valve needle 22. When the upper valve needle 24 and the lower valve needle 24 are in their closed positions, fuel injection terminates.

Another feature of the invention is that because the seat diameter of the upper valve needle 24 is reduced compared to that of the lower valve needle 22, there is a lower force requirement to lift the upper valve needle 24 to full lift. Also, when the lower valve needle 22 is required to lift, the pressure that builds up upstream of the outlets 31 typically aids in reducing the force requirement to lift the lower valve needle 22 to full lift.

In an alternative embodiment to that shown in FIGS. 7 to 15, the lift sleeve 78 and the lower pull tube 26 may be formed as a single component.

The present invention provides an advantage for providing controlled injections of gaseous fuel at varying injection pressures. When small, accurate injection quantities are required, only the upper valve needle 24 is required to be lifted. At high gas pressures, this is beneficial due to the restricted flow rate that can be achieved at a desired wall thickness of the lower valve needle 22. When high flow rates are required, high force requirements that are typically required to overcome the gas and spring pressures are more readily overcome as described above.

The present invention also provides advantages over varying injection conditions. For example, a lower injection pressure and injection rate may be beneficial early in the compression stroke when there is more time for air/fuel mixing, and a higher injection pressure and injection rate may be required in the later stages. In this case, injection of gaseous fuel can be controlled to achieve the desired injection quantities and injection rates based on the conditions.

LIST OF PARTS

10—fuel injector
12—upper actuator arrangement
14—lower actuator arrangement
16—tubular housing
16*a*—lower open end of the tubular housing
18—inlet bore
20—injection nozzle
22—lower valve needle
122—lower valve seat
22*b*—flutes or grooves on lower valve needle
22*c*—integral shoulder of lower valve needle
22*d*—collar of lower valve needle which defines spring seat
23—central bore of the lower valve needle
24—upper valve needle
124—upper valve seat
24*a*—upper portion of the upper valve needle
24*b*—intermediate portion of the upper valve needle
24*c*—enlarged head of the upper valve needle
26—first coupling member/lower pull tube
26*a*—first/upper drillings of lower pull tube
26*b*—second/middle drillings of lower pull tube
26*c*—third/lower drillings of lower pull tube
26*d*—bore of the lower pull tube
26*e*—rim of the lower pull tube
27—internal flow path of the lower pull tube
28—upper pull tube
28*a*—lower portion of upper pull tube
28*b*—drillings of upper pull tube
28*c*—internal bore of the upper pull tube
28*d*—upper radial drillings of upper pull tube
30—lower armature
31—nozzle outlets
32—upper armature
33—sac volume
34—nozzle body
34*b*—nozzle bore
34*c*—nozzle tip
34*d*—upper end of nozzle body 34
34*e*—shoulder region of nozzle body
35—insert
36—nozzle spring
37—spring chamber
39—delivery chamber
40—coil of the upper actuator
42—coil of the lower actuator
44—upper solenoid body
44*a*—stop surface of the upper solenoid body
46—lower solenoid body
46*a*—stop surface of the lower solenoid body
46*b*—drillings of lower solenoid body
48—armature return spring
52—annular member/lower stop member

52*a*—clearance
54—intermediate chamber
56—annular member/upper stop member
58—annular ring
70—anvil
70*a*—flange of the anvil
72—intermediate spring seat/plate
72*a*—engagement surface of spring seat/plate
74—intermediate spring
76—internal flow passage (annular clearance)
78—lift sleeve
80—spring seat
82—spring

The invention claimed is:

1. A fuel injector for delivering gaseous fuel to an internal combustion engine, the fuel injector comprising:

a nozzle body provided with a nozzle bore;

a first valve needle received within the nozzle bore and engageable with a first valve seat to control gaseous fuel delivery through at least one outlet of an injection nozzle at a first injection rate;

a first actuator arrangement for controlling movement of the first valve needle, the first actuator arrangement comprising a first coil which is mounted concentrically on an associated first solenoid body of the first actuator arrangement and further comprising a first armature which is mounted radially inward of the first coil;

a second valve needle which is engageable with a second valve seat to control gaseous fuel delivery through the at least one outlet of the injection nozzle at a second injection rate; and a second actuator arrangement for controlling movement of the second valve needle, the second actuator arrangement comprising a second coil which is mounted concentrically on an associated second solenoid body of the second actuator arrangement and further comprising a second armature which is mounted radially inward of the second coil;

wherein the second valve seat is defined by an upper end surface of the first valve needle, the first valve needle defining an internal flow path for gaseous fuel flow when the second valve needle is lifted from the second valve seat and the first valve needle is lifted from the first valve seat.

2. The fuel injector as claimed in claim 1, wherein the first valve needle has a first seat diameter and the second valve needle has a second seat diameter, and wherein the first seat diameter is greater than the second seat diameter.

3. The fuel injector as claimed in claim 1, wherein the internal flow path of the first valve needle defines a restriction to restrict a rate of flow of fuel therethrough.

4. The fuel injector as claimed in claim 1, including a first coupling member for the first valve needle, the first coupling member being coupled to the first armature of the first actuator arrangement so that actuation of the first actuator arrangement causes movement of the first coupling member and the first valve needle.

5. The fuel injector as claimed in claim 4, wherein the first coupling member is a first pull tube within which a portion of the first valve needle is received.

6. The fuel injector as claimed in claim 5, wherein the first pull tube defines a further internal flow path for gaseous fuel.

7. The fuel injector as claimed in claim 6, wherein the first pull tube is provided with at least one opening to allow gaseous fuel to flow into the internal flow path of the first valve needle when the second valve needle is lifted from the second valve seat.

8. The fuel injector as claimed in claim 4, wherein the first valve needle has a first lift member, the first lift member being actionable via the first actuator arrangement, wherein the first coupling member associated with the first valve needle is coupled to the first lift member so that movement of the first lift member results in movement of the first coupling member to lift the first valve needle away from the first valve seat.

9. The fuel injector as claimed in claim 1, including a coupling member associated with the second valve needle, the coupling member associated with the second valve needle being coupled to the second armature of the second actuator arrangement so that actuation of the second actuator arrangement causes movement of the coupling member associated with the second valve needle and also the second valve needle.

10. The fuel injector as claimed in claim 9, wherein the coupling member associated with the second valve needle takes the form of a pull tube within which a portion of the second valve needle is received.

11. The fuel injector as claimed in claim 10, wherein the pull tube within which the portion of the second valve needle is received defines a further internal flow path for gaseous fuel.

12. The fuel injector as claimed in claim 11, wherein the pull tube within which the portion of the second valve needle is received is provided with at least one opening to allow fuel within the further internal flow path to flow out of the pull tube within which the portion of the second valve needle is received.

13. The fuel injector as claimed in claim 1, wherein the second valve needle has an associated lift member, the associated lift member being actionable via the second actuator arrangement, wherein a coupling member associated with the second valve needle is coupled to the associated lift member so that movement of the associated lift member results in movement of the associated coupling member to lift the second valve needle away from the second valve seat.

14. The fuel injector as claimed in claim 13, wherein the coupling member associated with the second valve needle includes an engagement surface which is spaced from the associated lift member of the second valve needle by a separation distance when the second valve needle is seated against the second valve seat, the separation distance being closed when the coupling member associated with the second valve needle is actuated so as to bring the engagement surface into engagement with the associated lift member of the second valve needle, thereby causing the second valve needle to move away from the second valve seat.

15. The fuel injector as claimed in claim 13, further comprising a spring plate which is coupled to the coupling member associated with the second valve needle and which defines an engagement surface, wherein the engagement surface is spaced from the associated lift member of the second valve needle by a separation distance when the second valve needle is seated against the second valve seat, the separation distance being closed when the coupling member associated with the second valve needle is actuated so as to bring the engagement surface into engagement with the associated lift member of the second valve needle, thereby causing the second valve needle to move away from the second valve seat.

16. The fuel injector as claimed in claim 13, further comprising a first lift member for the first valve needle which is actuated via the first actuator arrangement, wherein a first coupling member associated with the first valve needle is coupled to the first lift member of the first valve needle so that movement of the first lift member results in movement of the first coupling member to lift the first valve needle away from the first valve seat.

* * * * *